United States Patent [19]

Harben, Jr. et al.

[11] 4,382,313
[45] May 10, 1983

[54] GIZZARD HARVESTING MACHINE

[75] Inventors: Grover S. Harben, Jr.; James S. Ellis; Joe M. Emmett, all of Gainesville, Ga.

[73] Assignee: Centennial Machine Co., Inc., Gainesville, Ga.

[21] Appl. No.: 179,516

[22] Filed: Aug. 19, 1980

[51] Int. Cl.³ .................................................. A22C 21/00
[52] U.S. Cl. ................................................ 17/11; 17/50
[58] Field of Search ................................ 17/11, 45, 50

[56] References Cited

U.S. PATENT DOCUMENTS

| | | | |
|---|---|---|---|
| 3,172,148 | 3/1965 | Hill | 17/11 |
| 3,406,425 | 10/1968 | Hill | 17/11 |
| 4,057,875 | 11/1977 | Hill | 17/11 X |
| 4,073,040 | 2/1978 | Hill | 17/11 X |
| 4,183,117 | 1/1980 | Meyn | 17/11 |
| 4,203,178 | 5/1980 | Hazenbroek | 17/11 X |
| 4,249,284 | 2/1981 | Graham et al. | 17/11 X |

*Primary Examiner*—Willie G. Abercrombie
*Attorney, Agent, or Firm*—B. J. Powell

[57] ABSTRACT

A system for processing a gizzard with the viscera attached where the viscera is conveyed along a poultry processing line by conveying means including adjusting means for adjusting the viscera to a predetermined length while the viscera is conveyed by the conveying means; viscera separating means for separating the gizzard from the rest of the viscera; transfer means for automatically transferring the viscera from the conveying means into said viscera separating means; conveyor means for moving the gizzard along a processing path; gizzard splitting means for splitting a gizzard moved along the processing path by the conveyor means to open the pocket in the gizzard; gizzard washing means for washing the contents from the open pocket in the gizzard moving along the processing path by the conveyor means; gizzard peeling means operatively associated with the conveyor means to receive the split and washed gizzard therefrom and peel the lining from the gizzard; transfer means for transferring the gizzard from the removal means after the viscera has been removed from the gizzard to the conveyor means while orienting the gizzard with respect to the conveyor means so that the gizzard is moved along the processing path with an orientation such that the gizzard splitting means splits the gizzard along a prescribed plane through the gizzard.

12 Claims, 20 Drawing Figures

GIZZARD HARVESTING MACHINE

BACKGROUND OF THE INVENTION

Machines for processing poultry gizzards have been available for a number of years. These machines have required that the poultry gizzard be manually removed from the poultry carcass and manually fed into the poultry processing machine after at least most of the viscera naturally attached to the gizzard was manually removed therefrom. After these machines were manually fed, the machine split the gizzard open, washed the contents out of the split gizzard and finally peeled the lining from the muscular portion of the gizzard to produce an edible product. Examples of these prior art gizzard processing machines are illustrated in U.S. Pat. Nos. 3,159,872; 3,172,872; 3,624,669 and 4,183,117. The primary disadvantage of these prior art gizzard processing machines is that manual operations are needed to prepare the gizzard for processing in the machine and/or to feed the machine. This has kept labor costs high to operate these gizzard processing machines.

More recently, attempts have been made to provide a mechanism to mechanically remove the viscera normally attached to the gizzard as an integral part of the poultry processing machine. Such machines with this feature are commonly known in the industry as gizzard harvesters. Examples of prior art gizzard harvesters are illustrated in U.S. Pat. Nos. 3,990,128; 4,057,875; 4,073,040 and 4,203,178. These gizzard harvesting machines have still required manual feeding which has continued to keep operating labor costs high. Moreover, these gizzard harvesting machines have attempted to maintain the gizzard in the same orientation during removal of the viscera and splitting of the gizzard for processing. The configuration of the gizzard and attached viscera is such that it is difficult to properly perform both these operations while the gizzard is maintained in the same orientation. As a result, these prior art gizzard harvesting machines have had difficulties in properly removing the viscera from the gizzard and subsequently properly splitting the gizzard.

Other attempts have been made to provide a viscera removal machine separate from the gizzard processing machine which mechanically removes the viscera normally connected to the gizzard. An example of this type of machine is illustrated in U.S. Pat. No. 4,074,390. These viscera removal machines as well as some of the gizzard harvesting machines have attempted to cut the viscera from the gizzard with a rotating cutting blade. These machines have had difficulty in removing the tenderlining section on the gizzard through which the viscera is attached to the gizzard in a manner that meets the approval of the U.S. Department of Agriculture inspection required in poultry processing.

SUMMARY OF THE INVENTION

These and other problems and disadvantages associated with the prior art are overcome by the invention disclosed herein by the provision of means which removes the viscera from the gizzard in a manner such that the portion of the gizzard associated with the tenderlining is removed as an incident to the removal of the viscera. The system of the invention first orients the gizzard properly for removal of the viscera from the gizzard and subsequently reorients the gizzard for splitting. As a result, not only is that portion of the gizzard associated with the tenderlining removed as an incident to the removal of the viscera from the gizzard, but also the gizzard is properly split for subsequent peeling in the peeling rolls of the type typically found in the gizzard processing machines.

The apparatus of the invention includes a viscera length adjustment unit for adjusting the length of the viscera attached to the gizzard to assist in subsequent handling; a feeding unit for feeding the gizzard and attached viscera to the rest of the machinery; a viscera removing unit which receives the gizzard and attached viscera from the feeding unit and removes the viscera from the gizzard along with the tenderlining portion of the gizzard; and a gizzard processing unit which splits the gizzard open, washes the contents out of the gizzard, and peels the lining from the interior of the gizzard. A transfer means is provided for transferring the gizzard from the viscera removal unit to the gizzard processing unit while reorienting the gizzard after the viscera has been removed therefrom so that the gizzard is properly oriented in the gizzard processing unit for splitting.

The viscera length adjustment unit is provided for trimming the viscera to a prescribed length while the gizzard with the viscera dangling therefrom is conveyed along the processing path by the plant conveyor system. Cutting the viscera to a preselected processing length assists in the subsequent removal of the viscera and tenderlining section of the gizzard from the edible portion of the gizzard.

The feeding unit serves to unload the gizzard with the viscera attached from the plant conveyor system and delivering them to the viscera removal unit in a timed sequence such that the viscera removal unit can properly remove the viscera and the tenderlining from the gizzard.

The viscera removal unit includes a pair of rolls having intermeshing teeth thereon which define a viscera receiving space therebetween at the infeed end of the rolls such that the viscera attached to the gizzard can pass through the viscera receiving space between the rolls, but the gizzard is precluded from passing through this space and rides on top of the rolls. The rolls are rotated in a direction such that the viscera is forced through the viscera receiving space and pulls the tenderlining portion of the gizzard into the viscera receiving space so that the teeth on the rolls grip the tenderlining portion. This holds the gizzard down against the rolls to locate the tenderlining portion with respect to the rolls without severing the viscera from the tenderlining portion. As the gizzard is moved down the rolls while it is maintained in this position on the rolls, the teeth increase the force on the tenderlining portion to separate the tenderlining portion from the gizzard along the juncture between the tenderlining portion and the rest of the gizzard. This also causes the rolls to release the gizzard. A roll unloading unit is provided adjacent the discharge end of the viscera removal rolls to displace the gizzard laterally off the rolls. This action assists the viscera removal rolls in removal of the tenderlining portion from the gizzard. The roll unloading unit moves the gizzard into the upper end of a transfer trough. The transfer trough has a V-shaped configuration conforming to part of the cross-sectional shape of the gizzard and a water stream flowing down the bottom of the trough reorients the gizzard as it is moved along the trough. The thusly oriented gizzard is then discharged into the gizzard processing unit with the proper orientation for processing.

The gizzard processing unit of the invention includes a conveyor which moves the oriented gizzard through the gizzard processing unit with gizzard splitting means to split the gizzard carrier by the conveyor, gizzard opening means for opening the split gizzard, and gizzard washing means for washing the contents out of the open gizzard. Gizzard peeling means is associated with a conveyor to receive the split and washed gizzard from the conveyor and peel the lining from the gizzard.

These and other features and advantages of the invention disclosed herein will become more apparent upon consideration of the following detailed description and accompanying drawings wherein like characters of reference designate corresponding parts throughout the several views and in which:

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

Figure 1:
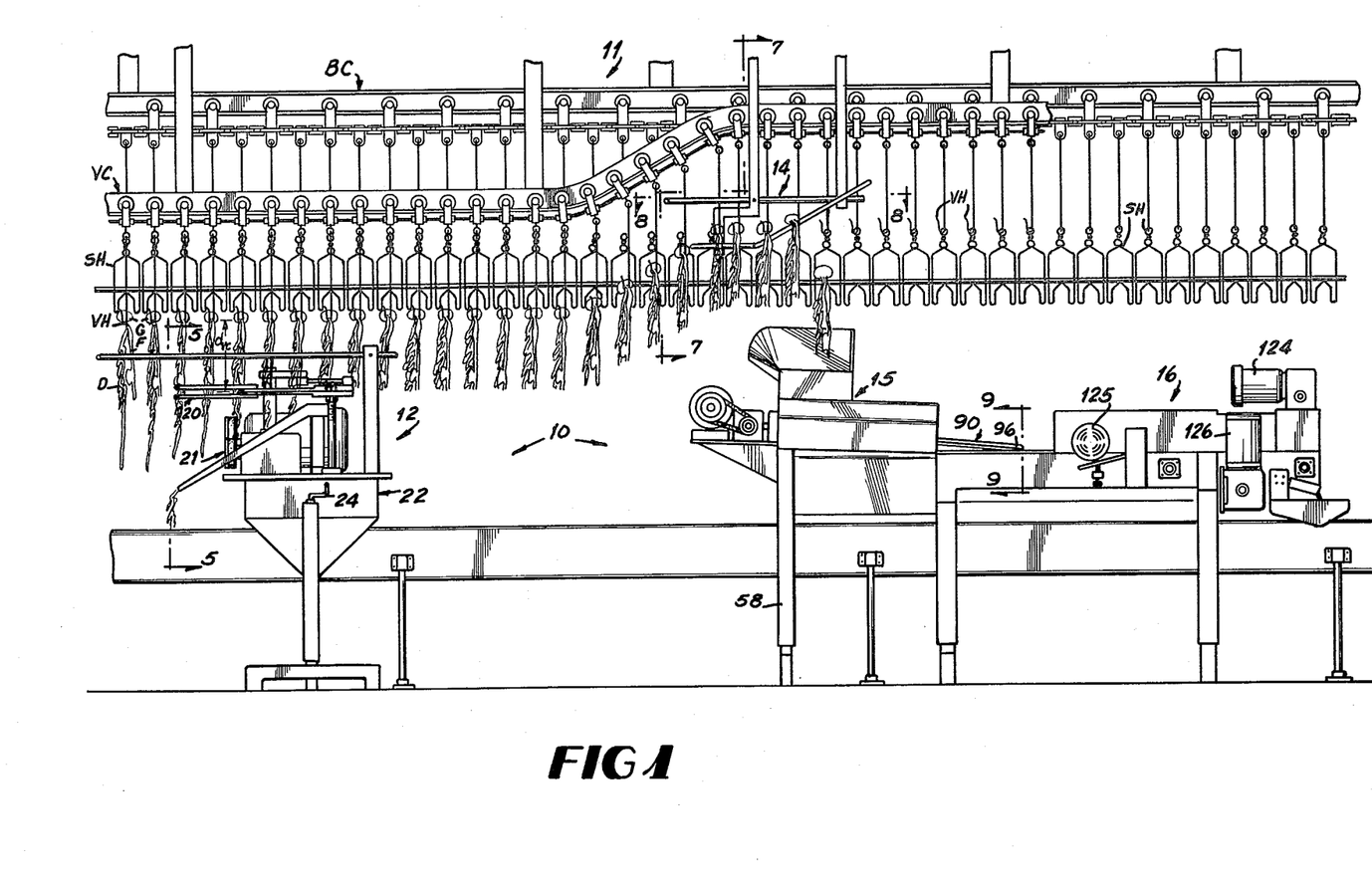
FIG. 1 is an elevational view illustrating the gizzard harvesting system of the invention.

Referring to FIG. 1 of the drawings, it will be seen that the invention is incorporated in a gizzard harvesting system 10 operating in conjunction with a gizzard processing plant conveyor system 11. A viscera length adjustment unit 12 is provided for cutting the viscera attached to the gizzard to a preselected processing length while it is conveyed along the processing path by the conveyor system 11. A feeding unit 14 is provided for unloading the gizzards with the viscera attached from the conveyor system 11 and dropping them into a viscera removal unit 15 in a prescribed time sequence. The viscera removal unit 15 removes the tenderlining portion of the gizzard together with the viscera from the gizzard. The viscera removal unit 15 delivers the thusly separated gizzard to a gizzard processing unit 16 with a given orientation. The gizzard processing unit 16 then processes the gizzard into an edible product by splitting the gizzard, opening the gizzard to expose the pocket contents, washing the exposed contents out of the gizzard, and finally peeling the pocket lining off the edible portion of the gizzard.

Figures 2, 3, 4:
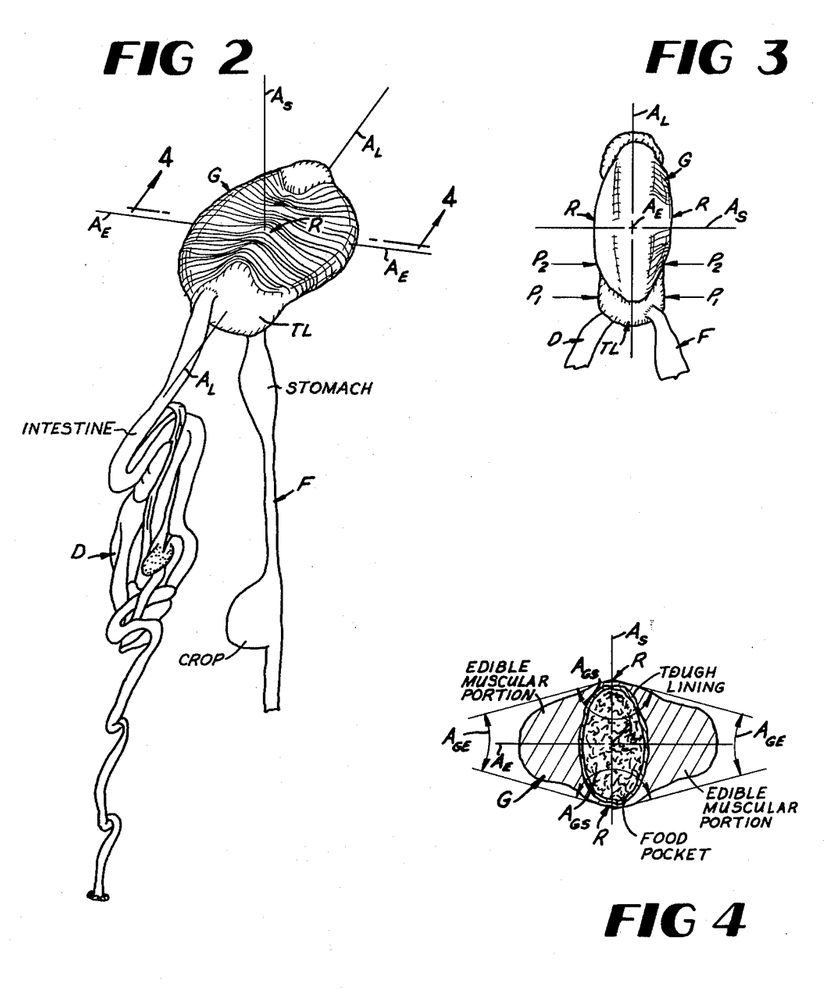
FIG. 2 is a perspective view of a gizzard with the attached viscera.
FIG. 3 is an enlarged side view of the gizzard with the attached viscera.
FIG. 4 is an enlarged transverse cross-sectional view taken generally along line 4—4 in FIG. 2.

A review of the poultry anatomy associated with the gizzard as illustrated in FIGS. 2-4 will facilitate the functional understanding of the invention. The gizzard G is part of the gastrointestinal tract of the poultry. The gastrointestinal tract is connected to the other viscera in the body cavity of the poultry through various connecting membranes. The heart, liver and gizzard are the edible parts of the viscera which are separated during the poultry processing operation. After the viscera has been removed from the body cavity of the poultry and inspected, the heart and liver are usually manually removed from the viscera leaving the rest of the viscera attached to the gizzard as seen in FIG. 2.

As seen in FIG. 2, the gizzard is connected to the rest of the gastrointestinal tract through a raised connecting portion at one end of the gizzard commonly called the tender lining section identified as TL in the drawings. The food intake portion F of the gastrointestinal tract including the crop, gullet or esophagus, and glandular stomach or proventriculus is connected to the tender lining section TL of the gizzard at an inlet position. The digestive portion D of the gastrointestinal tract, including the small and large intestines, is connected to the tender lining section TL of the gizzard at an outlet position spaced from the inlet position.

As seen in FIG. 4, the gizzard has an internal pocket in which the food received from the food intake portion F of the gastrointestinal tract is ground and from which the ground food passes into the digestive portion D of the gastrointestinal tract. A tough lining is provided around the internal pocket to separate the edible muscular portion of the gizzard from the food in the pocket. The internal pocket in the gizzard extends from the tender lining section TL along the longitudinal axis $A_L$ (FIGS. 2 and 3) of the gizzard to the opposite end of the gizzard but is closed at that end. As seen in FIGS. 2 and 4, the gizzard has an edge transverse axis $A_E$ normal to axis $A_L$ and extending through the edge of the gizzard. The gizzard also has a side transverse axis $A_S$ normal to axes $A_L$ and $A_E$. The internal pocket has a larger cross-sectional dimension along axis $A_S$ than along axis $A_E$. The gizzard has longitudinally extending ridges R along opposite sides of the outside of the gizzard in alignment with the pocket as best seen in FIG. 4. These external ridges are centered on a side plane lying along axes $A_L$ and $A_S$. An edge plane lying along axes $A_L$ and $A_E$ also extends through the gizzard perpendicular to the side plane. The gizzard may be split to open the internal pocket during processing by cutting through the muscular portion of the gizzard and the pocket lining either along the side plane or the edge plane. This allows the gizzard to be turned inside out to expose the contents in the pocket as will be explained.

To process the gizzard so as to meet the inspection requirements of the U.S. Department of Agriculture, the viscera and the tender lining section TL must be removed from the gizzard. The food contents in the internal pocket in the gizzard and the tough lining around the pocket must also be removed to meet these inspection requirements.

The poultry plant conveyor system 11 includes an overhead bird conveyor BC seen in FIG. 1 with bird holding shackles SH thereon that support the poultry through their hocks in a head lowermost position for processing and moves the poultry successively along a processing path through the plant with a prescribed distance between the birds. While the poultry is conveyed by the bird conveyor BC, the viscera is removed from the body cavity in known manner.

In the conveyor system 11, a separate overhead viscera conveyor VC is provided with viscera holding hooks VH. After the viscera is removed from the body cavity of the poultry, it is separated from the poultry and hung on the viscera holding hooks VH. The viscera holding hooks VH are designed so that the gizzard is located adjacent the hook VH and the rest of the viscera is dangling from the opposite side of the hook. The viscera holding hooks VH are spaced apart the same prescribed distance as the shackles SH on the bird conveyor BC and are moved synchronously with the shackles SH so that the viscera remains associated with the bird from which it was removed until passage of the bird and viscera past the inspection station. After inspection, the viscera conveyor VC can move the viscera away from the bird conveyor BC along a viscera processing path for processing of the viscera.

As seen in FIG. 1, the viscera conveyor VC moves the viscera past the viscera length adjustment unit 12. It will be noted that the weight of the viscera keeps the gizzard up against the viscera holding hook VH while the rest of the viscera dangles therebelow. It has been found that the viscera removal unit 15 operates more reliably when the viscera attached to the gizzard has been shortened to a prescribed length, usually about 10–15 inches and where both the food intake and digestive portions F and D of the gastrointestinal tract left attached to the gizzard have about the same length.

In some processing operations, the separate viscera conveyor is not used. Rather, the viscera removed from the body cavity is left attached to the poultry by the food intake portion of the gastrointestinal tract for inspection. In this operation, the gizzard hangs out of the rear end of the bird and the digestive portion of the gastrointestinal tract along with the other viscera attached thereto dangles below the gizzard. In this type operation, the viscera length adjustment unit 12 is associated with the overhead bird conveyor BC so that this conveyor moves the viscera past the unit 12.

Figure 5:
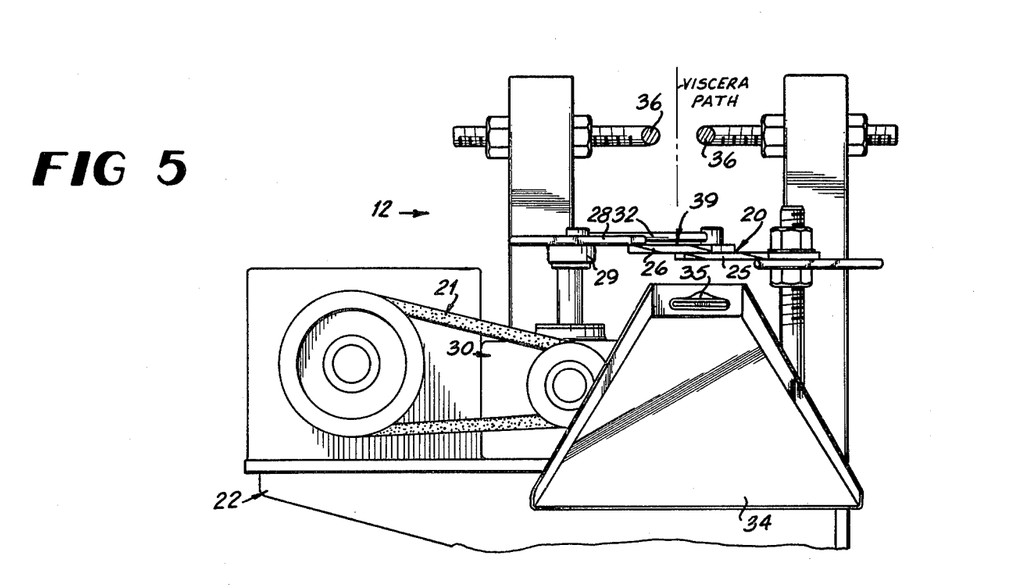
FIG. 5 is an enlarged view of the viscera length adjustment unit taken generally along line 5—5 in FIG. 1.
Figure 6:
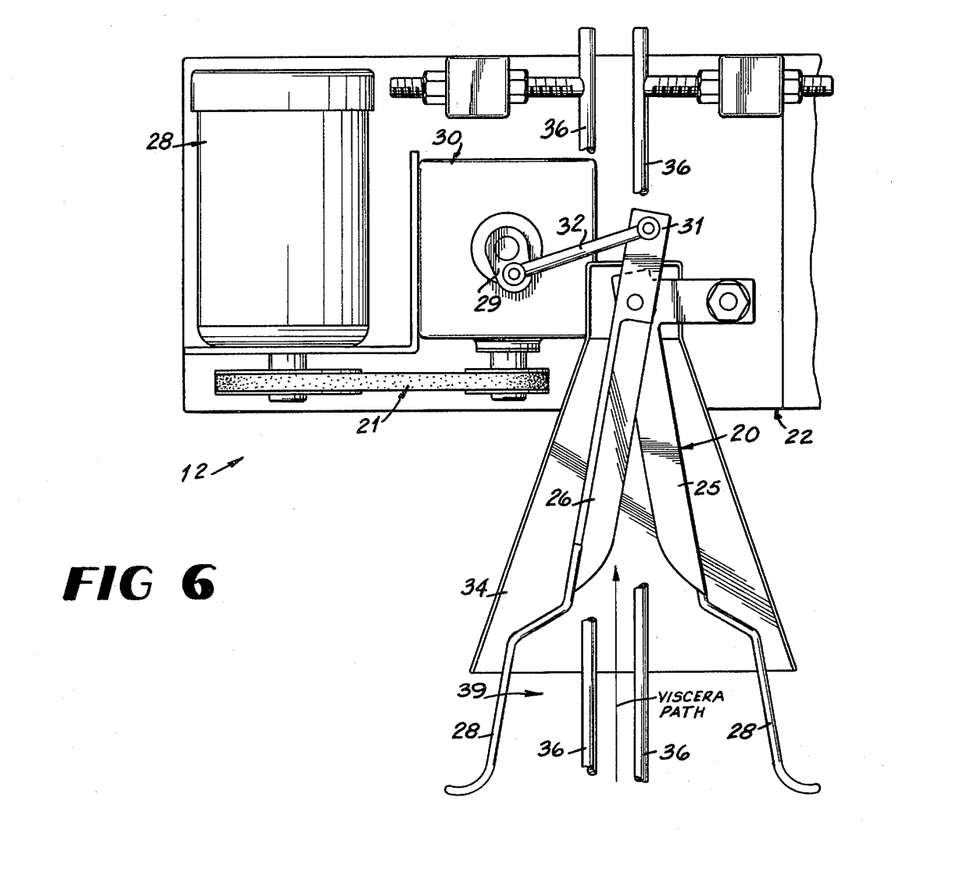
FIG. 6 is a top view of the viscera length adjustment unit seen in FIG. 5.

The viscera length adjustment unit 12 best seen in FIGS. 1, 5 and 6 includes a shear mechanism 20 and a drive mechanism 21 both mounted on a support frame 22. The suppport frame 22 is provided with a height adjustment mechanism 24 seen in FIG. 1 for changing the vertical spacing between the viscera holding hooks VH and the shear mechanism 20.

The shear mechanism 20 includes a fixed shear blade 25 and a movable shear blade 26 pivoted on the fixed blade 25 so that when the blade 26 is pivoted so that the cutting edges on the blades 25 and 26 come together, any viscera therebetween will be cut. The blades 25 and 26 are horizontally oriented and positioned so that the viscera dangling from hooks VH will move between the cutting edges on the blades when they are open. The height adjustment mechanism 24 is adjusted to vertically space the blades 25 and 26 the distance $d_{VC}$ below the viscera holding hooks VH as seen in FIG. 1 so that the viscera will be cut to this length.

The drive mechanism 21 includes a motor 28 driving an eccentric 29 through a gear box 30. The eccentric 29 is connected to a drive projection 31 on the movable shear blade 26 through a drive link 32 so that the blades 25 and 26 are opened and closed as the eccentric 29 is rotated by motor 28. It will be understood that the eccentric 29 may alternatively be rotated by an idler drive unit connected to the viscera conveyor or bird conveyor as is known in the art.

A deflection pan 34 is provided for deflecting the viscera removed by the shear blades 25 and 26 into the offal removal system already available in the processing plant. A water flush pipe 35 may be provided on the pan 34 to keep it clean.

It is important that the pivoted blade action be used to shear the viscera rather than rotary blades. This is because the viscera is difficult to cut and the rotary blades tend to wrap the viscera therearound as the viscera is being cut.

To keep the viscera lined up with the shear blades 25 and 26, a pair of viscera guide bars 36 are provided between which the viscera passes as seen in FIGS. 1 and 5. These guide bars 36 may be adjustable as best seen in FIG. 5. To prevent the viscera moved by conveyor VC bypassing blades 25 and 26 while they are closed, an angled arresting guide 28 is provided on the projecting end of each of the blades 25 and 26 so that, when the blades are closed, the arresting guides 28 define a viscera receiving space 39 therebetween. Thus, when the blades 25 and 26 momentarily close to cut the viscera to length, the uncut viscera approaching the blades 25 and 26 passes into the space 39 and is held there until the blades 25 and 26 are pivoted open whereupon the arrested viscera swings in between the blades to be cut the next time the blades close.

The digestive portion D of the gastrointestinal tract is much longer than the food intake portion F thereof and has usually unfolded sufficiently so that it hangs much lower than the food intake portion. Thus, the digestive portion of the gastrointestinal tract and the viscera attached thereto forms the major portion of the viscera removed by unit 12.

As the viscera conveyor VC continues to move the gizzard and attached viscera along the viscera conveying path, the hooks VH move past the feeding unit 14 as seen in FIG. 1. The feeding unit 14 unloads the gizzard and attached viscera from each hook VH as it passes thereby so that the gizzard and attached viscera drops into the viscera removal unit 15 to feed it.

Figures 7, 8, 9:
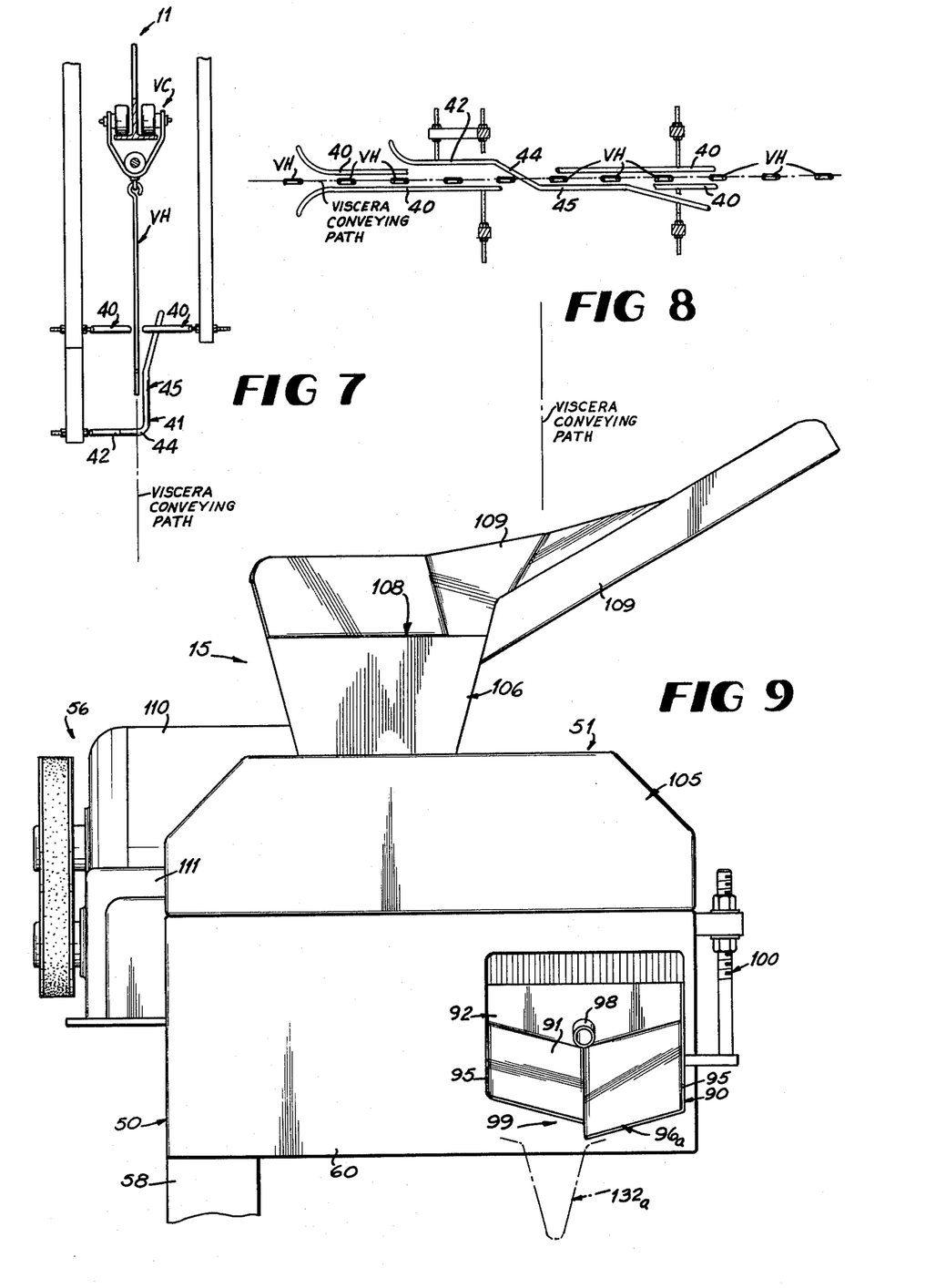
FIG. 7 is an enlarged sectional view of the unloading unit taken generally along line 7—7 in FIG. 1.
FIG. 8 is an enlarged sectional view of the unloading unit taken generally along line 8—8 in FIG. 1.
FIG. 9 is an enlarged discharge end view of the viscera removal unit taken generally along line 9—9 in FIG. 1.

The feeding unit 14 best seen in FIGS. 1, 7 and 8 includes a pair of hook guide rods 40 which engage the viscera holding hooks VH above the gizzard to keep the hooks generally vertically oriented as they are moved by the viscera conveyor VC past unit 14. A hook unloading bar 41 is provided which lifts the gizzard and attached viscera out of the hook VH as it moves thereby to release same so that they drop into the viscera removal unit 15 as will become more apparent. The unloading bar 41 has an inlet section 42 at its leading end located on one side of the viscera conveying path, an intermediate displacement section 44 connected to the trailing end of the inlet section 42 and angled across the viscera conveying path under the viscera holding hooks VH, and an unloading section 45 connected to the trailing end of the displacement section 44 and angled upwardly along the viscera conveying path so that it extends from below the viscera holding portions of the hooks VH at its leading end to a position thereabove at its trailing end. It will be seen that the inlet and unloading sections 42 and 45 extend generally parallel to the viscera conveying path when viewed from above but on opposite sides thereof.

The inlet section 42 is generally horizontally oriented and lies a prescribed distance below the hooks VH less than the length of the shortened viscera dangling from the hooks VH. Thus, the viscera passes along one side of section 42 and is engaged by the intermediate section 44 extending across the viscera conveying path to keep the viscera extending over and sliding along the section 44. The viscera continues to extend over the bar 41 as it slides along the unloading section so that, when the unloading section 45 rises above the lower end of the hook VH, the gizzard is lifted along with the viscera. When the gizzard has been lifted sufficiently to clear the viscera holding portions of hooks VH, the weight of the viscera flips the gizzard over the unloading section 45 on bar 41 and the gizzard and attached viscera is free to drop into the viscera removal unit 15. Because the viscera conveyor VC moves the gizzards with the viscera attached past the unloading bar 41 in timed sequence, they will be unloaded in timed sequence into the viscera removal unit 15.

Figure 10:
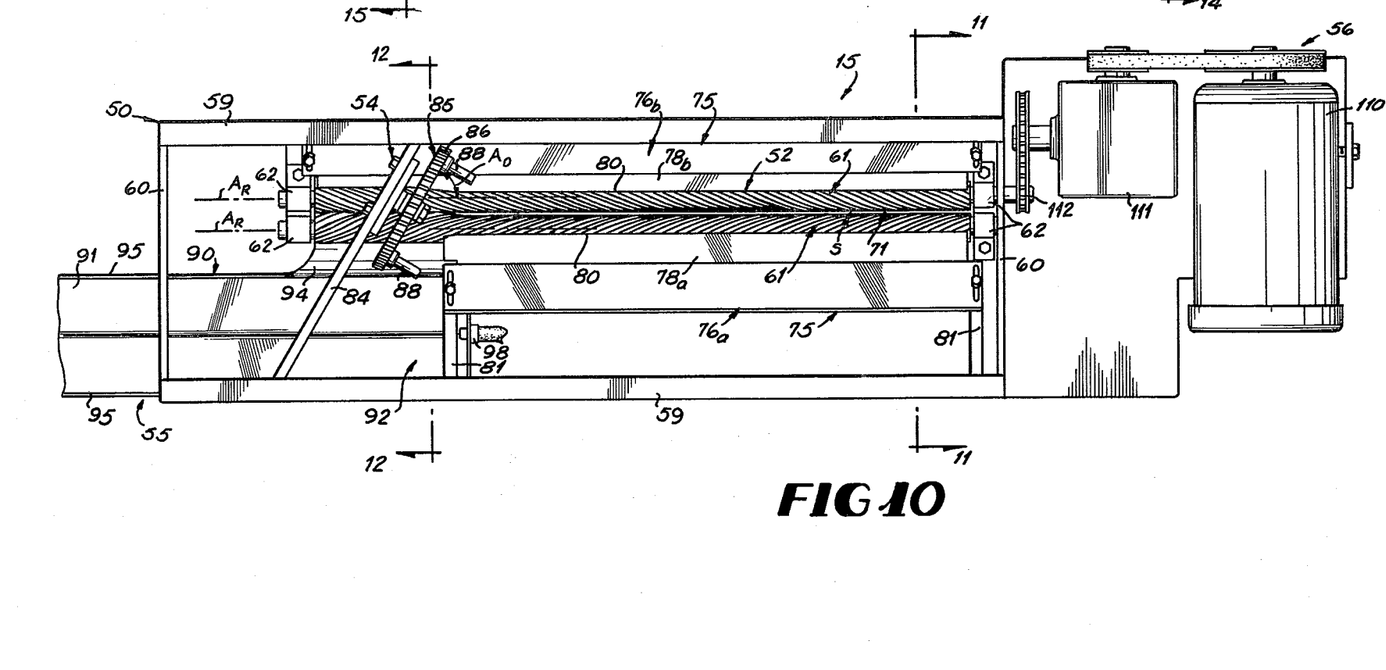
FIG. 10 is an enlarged top plan view of the viscera removal unit with the top cover removed.

The viscera removal unit 15 is best seen in FIGS. 1 and 9-15 and includes generally a support frame 50 which mounts a cover and chute assembly 51 (FIGS. 1, 9 and 11), a viscera removal roll assembly 52 (FIGS. 10-12), an unloader mechanism 54 (FIGS. 10 and 12), a discharge alignment mechanism 55 (FIGS. 9, 10 and 12), and drive means 56 (FIGS. 1 and 10). The cover and chute assembly 51 receives the gizzard with the viscera attached from the feeding unit 14 and directs same into operative contact with the viscera removal roll assembly 52 which removes the tender lining section along with the viscera from the gizzard. The unloader mechanism 54 removes the trimmed gizzard from the viscera removal roll assembly 52 and delivers same to the discharge alignment mechanism 55 which orients the trimmed gizzard and delivers same to the gizzard processing unit for processing.

The support frame 50 is supported at one end by a floor engaging support leg 58 and at the other end by the gizzard processing unit 16 as best seen in FIG. 1 so that frame 50 is generally horizontal. The frame 50 includes a pair of spaced apart side beams 59 connected at opposite ends by end plates 60 as best seen in FIG. 10.

Figure 11:
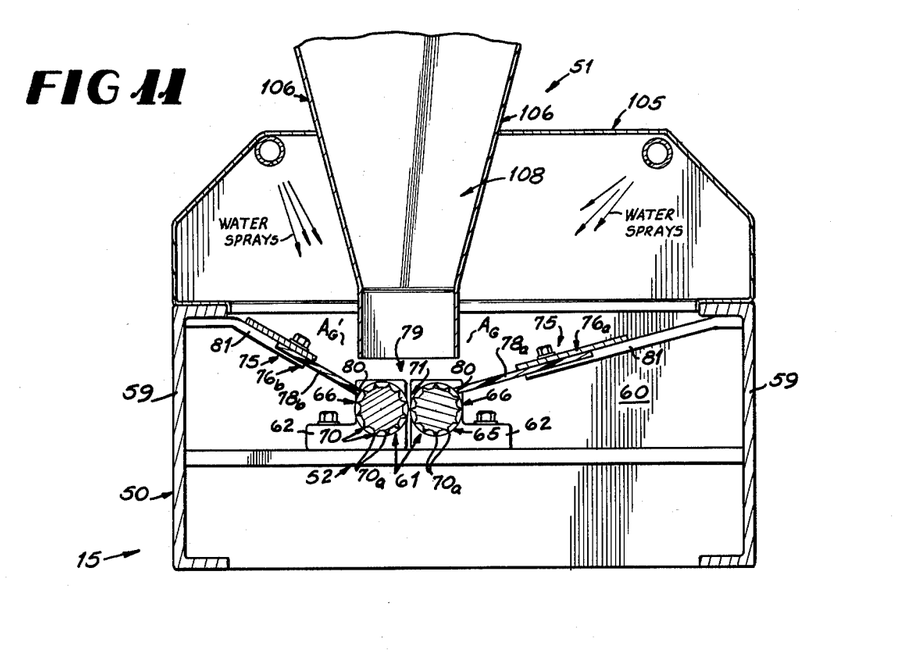
FIG. 11 is an enlarged transverse cross-sectional view of the viscera removal unit taken generally along line 11—11 in FIG. 10.
Figure 12:
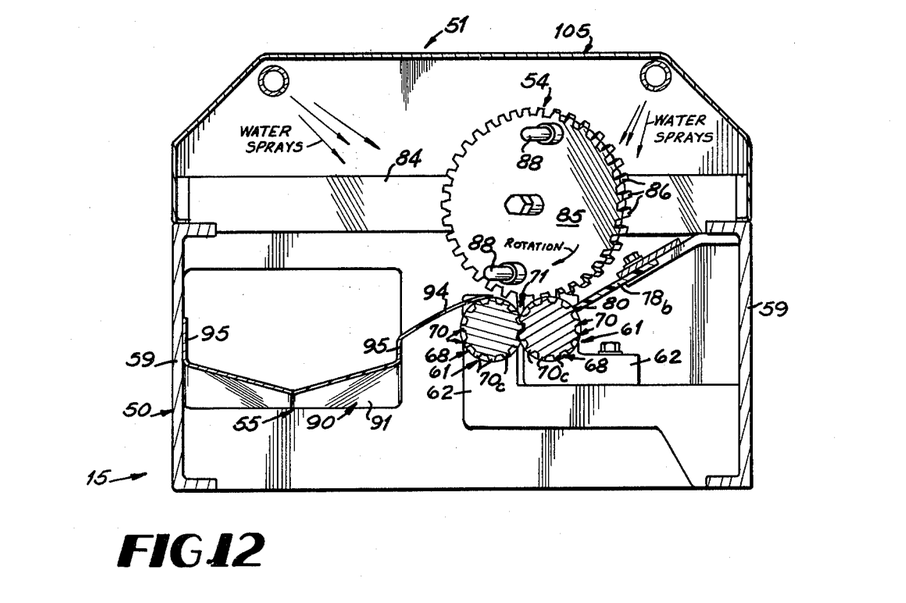
FIG. 12 is an enlarged transverse cross-sectional view of the viscera removal unit taken generally along line 12—12 in FIG. 10.

The viscera removal roll assembly 52 is mounted on the frame 50 as seen in FIGS. 10-12. The roll assembly 52 includes a pair of viscera removal rolls 61, each rotatably mounted at its opposite ends in bearing blocks 62. The bearing blocks 62 are mounted on the frame 50 so that the rolls 61 extend longitudinally of the frame 50 and the bearing blocks 62 are adjustable so that the rolls 61 can be shifted with respect to each other. Usually, the bearing blocks 62 are adjusted so that the roll axes $A_R$ are generally parallel to each other, horizontally aligned with each other, and spaced apart a distance $d_R$ seen in FIGS. 13-15 as will become more apparent.

Figure 13:
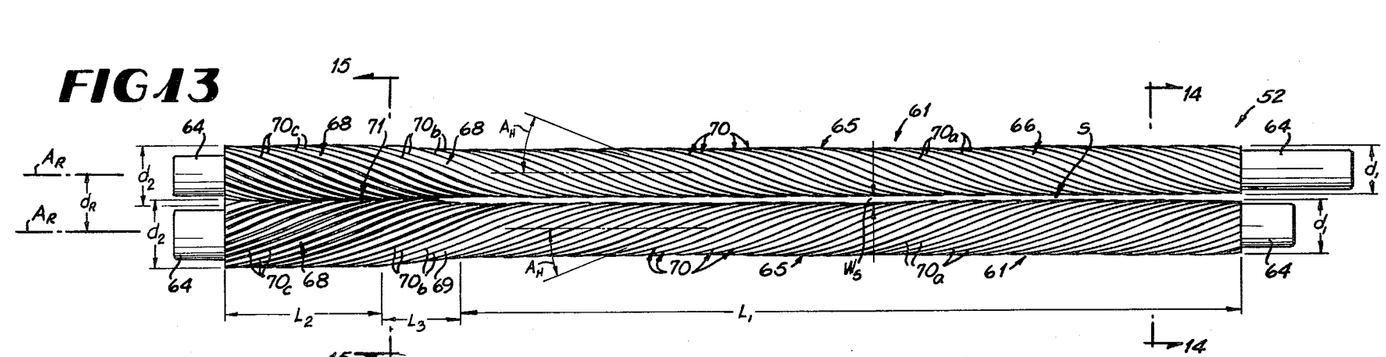
FIG. 13 is an enlarged top plan view of the viscera removal rolls.
Figure 14:
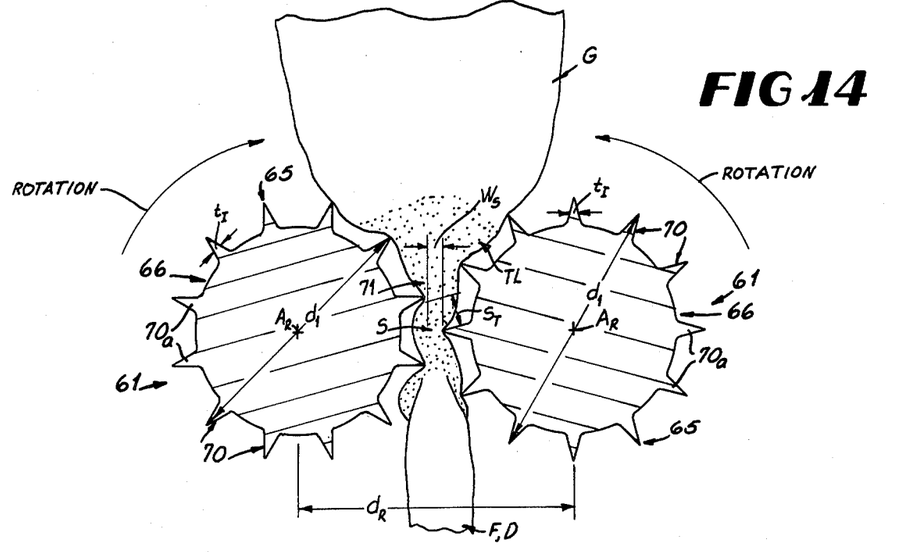
FIG. 14 is an enlarged transverse cross-sectional view of the infeed end of the viscera removal rolls taken generally along line 14—14 in FIG. 13.
Figure 15:
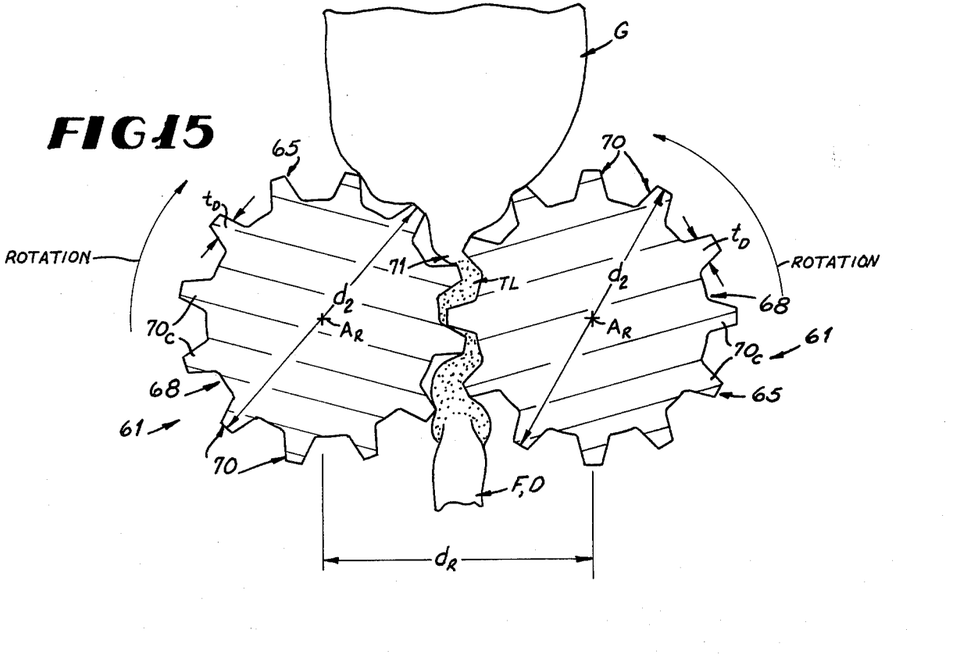
FIG. 15 is an enlarged transverse cross-sectional view of the discharge end of the viscera removal rolls taken generally along line 15—15 in FIG. 13.

Each of the rolls 61 is equipped with reduced diameter shaft ends 64 as seen in FIG. 13 on opposite ends thereof rotatably journalled in the bearing blocks 62 as seen in FIG. 10 and a toothed section 65 between the shaft ends 64. As best seen in FIGS. 13-15, the toothed section 65 has an infeed portion 66 of outside diameter $d_1$ and length $L_1$ at one end thereof (the right end as seen in FIG. 13), a discharge portion 68 of outside diameter $d_2$ and length $L_2$ at the opposite end thereof (the left end as seen in FIG. 13), and a tapered portion 69 of length $L_3$ connecting the infeed and discharge portions 66 and 68. The diameter $d_2$ is greater then diameter $d_1$ as will become more apparent. The tapered portion 69 tapers outwardly from the diameter $d_1$ at its juncture with the infeed portion 66 to diameter $d_2$ at its juncture with the discharge portion 68. The rolls 61 are positioned so that the corresponding portions on the toothed sections 65 are laterally aligned with each other.

Each toothed section 65 is provided with a plurality of teeth 70 equally spaced circumferentially around the periphery thereof. Each tooth 70 extends along the entire length of the toothed section 65 and also helically therearound at a helix angle $A_H$ seen in FIG. 13. It will be noted that the teeth 70 on each of the rolls 61 extend helically around that roll in the opposite sense to the teeth 70 on the opposite roll 61 as will become more apparent. Also, the teeth 70 are arranged so that when a gizzard is placed on top of the rolls 61 with the rolls rotating so the top of the rolls are moving toward each other as indicated in FIGS. 14 and 15, the teeth 70 will move the gizzard along the length of the rolls 61 from the infeed portions 66 toward the discharge portions 68 (from the right to the left as seen in FIGS. 10 and 13). Each tooth 70 has an infeed segment $70_a$ along the infeed portion 60 of section 65, a tapered segment $70_b$ along the tapered portion 69 of section 65 and a discharge segment $70_c$ along the discharge portion 68 of section 65. The segments $70_{a-c}$ are integral with each other end-to-end to form the continuous tooth 70.

The discharge segments $70_c$ of teeth 70 on each roll 61 have an appropriate cross-sectional tooth from to drivingly mesh with the discharge segments $70_c$ of the teeth 70 on the other roll 61. While a variety of cross-sectional tooth forms for the discharge segments $70_c$ may be used, it has been found that an involute tooth form with a thirty degree pressure angle not only gives good drivability between the discharge portions 68 of rolls 61, but also provides enhanced self-cleaning ability to the intermeshing segments $70_c$ of the teeth. As seen in FIGS. 13 and 15, the bearing blocks 62 are adjusted so that the roll spacing distance $d_R$ between the rolls 61 is such that the discharge segments $70_c$ of teeth 70 on one roll 61 are maintained intermeshed with the discharge segments $70_c$ of teeth 70 on the other roll 61 at the nip 71 between the rolls. By maintaining the discharge segments 70c in mesh, it will be seen that rotation of one of the rolls 61 drivingly rotates the other roll 61.

On the other hand, the outside diameter $d_1$ of the infeed portions 66 on rolls 61 is selected so that with the rolls 61 at the roll spacing distance $d_R$, the infeed segments 70a of teeth 70 on each of the rolls 61 do not intermesh with the segments 70a of teeth 70 on the other roll 61 and define a viscera receiving space S of width $W_S$ between the projecting ends of the teeth 70 on the infeed portions 66 on rolls 61 at the nip 71 as seen in FIG. 13. The intermeshing discharge segments 70c of the teeth 70 keep the infeed segments 70a on one of the rolls 61 substantially centered between the infeed segments 70a on the other roll 61 at the nip 71 between the rolls. In addition to the infeed segments 70a of teeth 70 not intermeshing, the cross-sectional tooth form of the infeed segments 70a are modified so that the basic cross-sectional thickness $t_I$ seen in FIG. 14 is less than the basic cross-sectional thickness $t_D$ of the discharge segments 70c seen in FIG. 15 so that the leading edge of each infeed segment 70a on each of the rolls 61 is spaced from the trailing edge of the adjacent infeed segment 70a on the other roll 61 at the nip 71 between the rolls by the distance $S_T$ seen in FIG. 14. This provides additional clearance to prevent inadvertent separation of the viscera from the gizzard while the gizzard is supported between the nip of the rolls along the infeed portions 66 as will become more apparent. It will also be noted that cross-sectional tooth shape of the infeed segments 70a has been modified so that the projecting ends thereof are substantially pointed rather than having a generally flat land surface thereon as does the discharge segments 70c. This serves to better position the gizzard so that the tender lining section can be removed as will become more apparent.

The cross-sectional tooth form of the tapered segments 70b of teeth 70 are modified so that they smoothly taper in thickness from that of the segments 70a at their juncture with the segments 70a to that of the segments 70c at their juncture with the segments 70c. Thus, the tapered segments 70b become thicker as the diameter of the tapered portion 69 of the rolls 61 increases. This causes the segments 70b to start overlapping intermediate their ends so that the leading and trailing edges of segments 70b on the rolls 61 at the nip 71 to come sufficiently close together by the time the discharge segments 70c are reached to cause the tender lining section to be separated from the gizzard and removed along with the viscera as will become more apparent.

While the number of teeth 70 may vary, it has been found that a diametrical pitch of 8-16 is satisfactory with a diametrical pitch of ten preferred. An outside diameter $d_2$ of about 1.3 inches and an outside diameter $d_1$ of about 1.1 inches have been found satisfactory. A width $W_S$ for space S between the infeed portions 66 on rolls 61 of about 0.10-0.15 inch has been found satisfactory for medium size gizzards. Appropriate adjustments would be made for small or large gizzards.

A guide assembly 75 seen in FIGS. 10-12 is mounted on the frame 50 to keep the gizzard and attached viscera in operative contact with the viscera removal rolls 61. The guide assembly 75 includes a pair of plate subassemblies 76a and 76b, one being associated with each of the viscera removal rolls 61. Plate subassembly 76a includes an elongate guide plate 78a extending longitudinally along the toothed section 65 of the roll 61 associated therewith. The guide plate 78a is oriented at an angle $A_G$ with the vertical so that the guide plate 78a extends up and away from the viscera removal roll 61. Plate subassembly 76b includes an elongate guide plate 78b extending longitudinally along the toothed section 65 of the roll 61 associated therewith. The guide plate 78b is oriented at an angle $A_G'$ with the vertical so that the guide plate 78b extends up and away from the viscera removal roll 61. It will thus be noted that the guide plates 78a and 78b extend up and away from opposite sides of the viscera removal roll 61 and away from each other to define a viscera feeding area therebetween as best seen in FIG. 11. It will be seen from FIG. 10 that the guide plate 78 has a length substantially equal to the length of the toothed section 65 on the viscera removal roll 61 and is oriented so that it extends along substantially the entire length of the toothed section 65 on the viscera removal roll 61 associated therewith while the other guide plate 78a is shorter than the length of the toothed section 65 on the viscera removal roll 61 associated therewith. The shorter guide plate 78a is aligned with that end of the toothed section 65 at the infeed portion 66 so that it terminates short of the opposite end of the toothed section 65 on the roll. This permits the gizzard to be unloaded from on top of the viscera removal rolls 61 before the gizzard reaches the ends of the discharge portions 68 of the toothed sections 65 on the rolls 61 as will become more apparent.

The inboard edge 80 of each of the guide plates 78a and 78b conforms with the general external shape of the viscera removal roll 61 and rides against the teeth 70 on the roll 61 outboard of the nip 71 between the rolls and above the common plane of the rolls axes $A_R$ of rolls 61 as best seen in FIG. 11. Thus, when the gizzard and attached viscera is dropped in the viscera feeding area 79 between the guide plates 78a and 78b, the gizzard and viscera will be maintained on top of the rolls so that the teeth 70 on the rolls will feed the viscera down between the rolls in the infeed portions 66 as will become more apparent. The guide plates 78a and 78b are made of a plastic material so that the teeth 70 on the viscera removal rolls 61 are not worn by the rubbing action between the guide plates 78a and 78b and the teeth 70.

Each guide plate 78a and 78b is mounted at its opposite ends on angled brackets 81 mounted on the side beams 59 of the support frame 50 as best seen in FIGS. 10 and 11. The brackets 81 and guide plates 78 are sufficiently resilient to maintain bearing contact between the inboard edges 80 of the guide plates 78a and 78b and the teeth 70 on the viscera removal rolls 61.

The unloader mechanism 54 best seen in FIGS. 10 and 12 is mounted between the side beams 59 on the support frame 50 over the discharge portions 78 of the viscera removal rolls 61. The unloading mechanism 54 includes generally a support bracket 84 which rotatably mounts a circular deflection plate 85 thereon. The deflection plate 85 is provided with peripheral teeth adapted to mesh with the discharge segments 70c of the teeth 70 on one of the viscera removal rolls 61 so that the deflection plate 85 is rotated clockwise as seen in FIG. 12. The deflection plate 85 is adjustably mounted on a support bracket 84 so that the deflection plate 85 can be positioned to properly mesh with the teeth 70 on the roll 61 so that the teeth 70 rotatably drive the deflection plate 85. It will be seen that the teeth 86 on the deflection plate 85 engage the teeth 70 on that viscera removal roll 61 opposite the discharge opening provided past the shorter guide plate 78. The deflection plate 85 is angled across the rolls 61 at the angle $A_D$ with the roll axes $A_R$ illustrated at about 65°–70° in FIG. 10. The deflection plate 85 is provided with a pair of dislodging projections 88 which project outwardly from the deflection plate 85 generally normal thereto so that the disloding projections 88 extend generally toward the infeed portions 66 on the rolls 61. It will thus be seen that, as the deflection plate 85 is rotated, the dislodging projections sweep over the viscera removal rolls 61 in the vicinity of the juncture between the tapered portions 69 and the discharge portions 68 so that a gizzard carried by the rolls 61 will be discharged laterally thereof by the dislodging projections 88 through the opening past the end of the shorter guide plate 78$_a$ on the guide assembly 75. As will become more apparent, the action of the dislodging projections 88 also serves to assist the viscera removal rolls 61 in separating the tender lining section from the gizzard as well as unloading the gizzard from the rolls 61 into the discharge alignment mechanism 55.

The discharge alignment mechanism 55 includes an alignment trough 90 having a bottom wall 91 with a generally V-shaped transverse cross-section angled so that it conforms generally to the cross-sectional shape of the gizzard as best seen in FIG. 4. This shape causes the gizzard to tend to seek a prescribed orientation in the alignment trough 90 so that the longitudinally extending ridges R along opposite sides of the outside of the gizzard extend longitudinally of the alignment trough 90. This orients the longitudinal axis $A_L$ of the gizzard longitudinally of the trough and the side axis $A_S$ generally vertical. The inlet end 92 of the alignment trough 90 is positioned adjacent the opening past the shorter guide plate 78 so that the gizzard discharged from the viscera removal rolls 61 by the disloding projections 88 on the unloader mechanism 54 falls into the alignment trough 90. A deflection member 94 is provided on the side of the alignment trough 90 adjacent the opening past the shorter guide plate 78 to direct the gizzard into the alignment trough 90. The alignment trough 90 is also provided with upstanding side walls 95 to keep the gizzard in the trough 90.

The alignment trough 90 extends out of the viscera removal unit over the gizzard processing unit 16 and angles downwardly from its inlet end 92 to its discharge end 96 at an angle of about 10°–15° as seen in FIG. 1. A water pipe 98 is connected to the upper end of the alignment trough 90 to supply water that flows down the bottom wall 91 of the trough 90. When the gizzard drops into the alignment trough 90, this water serves to transport the gizzard along the trough 90 out of the discharge end 96 into the processing unit 16. The flowing water also serves to facilitate the alignment of the ridges on the gizzard longitudinally of the trough 90. It will be appreciated that, when the gizzards are aligned in the trough 90 so that the external ridges R extend longitudinally of the trough, that end of the gizzard from which the tender lining section has been removed may be leading or trailing. However, the gizzard processing unit 16 is able to accept gizzards without regard to the direction in which that portion of the gizzard from which the tender lining has been removed is facing. The gizzards are washed out of the alignment trough 90 into the gizzard processing unit 16 which then processes the gizzards and will become more apparent.

The discharge end of the alignment trough 90 is shaped to control the orientation of the gizzard delivered to the gizzard processing unit 16. Some gizzard processing units 16 are designed to accept gizzards with the edge axis $A_E$ (FIGS. 2 and 4) vertical while other gizzard processing units 16 are designed to accept gizzards with the side axis $A_S$ (FIGS. 2 and 4) vertical. In both instances, it is preferable that the longitudinal axis $A_L$ (FIGS. 2 and 4) of the gizzard be horizontal. The discharge end 96$_a$ of trough 90 seen in FIGS. 16 and 17 is designed to deliver gizzards with the edge axis $A_E$ vertical while the discharge end 96$_b$ shown in FIGS. 18 and 19 is designed to deliver gizzards with the side axis $A_S$ vertical.

Figure 16:
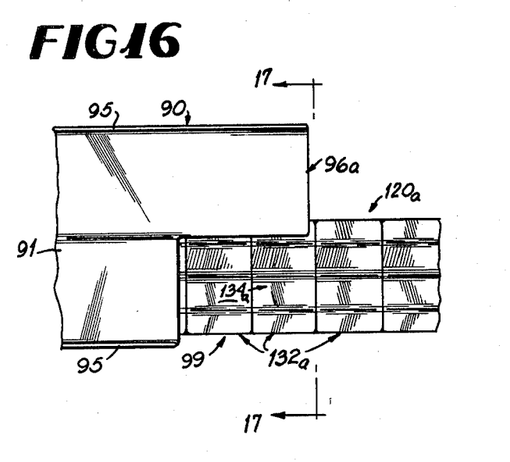
FIG. 16 is an enlarged top view of the discharge end of the discharge trough from the viscera removal unit showing its relationship to the feed chain of the gizzard processing unit.
Figure 17:
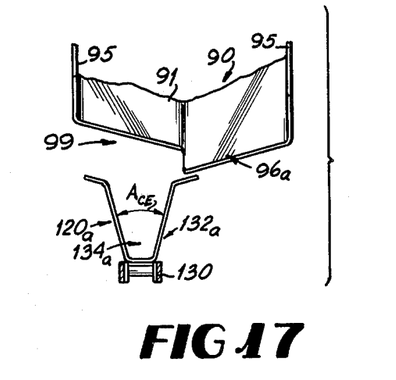
FIG. 17 is a transverse cross-sectional view taken generally along line 17—17 in FIG. 16.

The discharge end 96$_a$ of trough 90 seen in FIGS. 16 and 17 has one-half of a section of the bottom wall 91 removed to form a cutout 99. When the gizzards being washed down the trough 90 reach the cutout 99, they fall out of the trough while rotating about their longitudinal axis $A_L$. The edge positioning feed chain 120$_a$ on the gizzard processing unit 16 seen in FIGS. 16 and 17 is located under the discharge end 96$_a$ of trough 90 so that the gizzard seats in the chain 120$_a$ when the gizzard has rotated about its longitudinal axis $A_L$ until the edge axis $A_E$ is vertical. The water flowing from trough 90 onto chain 120$_a$ assists in properly seating the gizzard. An appropriate adjustment 100 seen in FIG. 9 is provided to allow the position of the discharge end 96$_a$ of the chute relative to the feed chain 120$_a$ to be made. The feed chain 120$_a$ maintains the gizzard in this position for feeding the gizzard processing unit 16 as will become more apparent.

Figure 18:
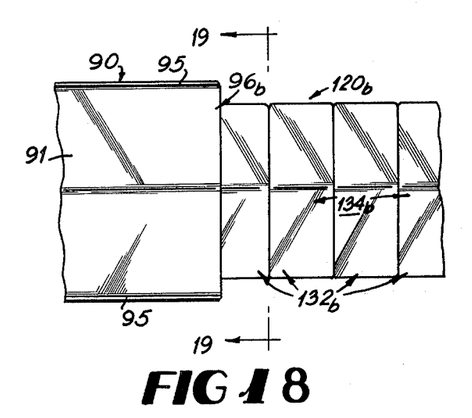
FIG. 18 is an enlarged top view of the discharge end of a second embodiment of the discharge trough from the viscera removal unit showing its relationship to a second embodiment of the feed chain on the gizzard processing unit.
Figure 19:
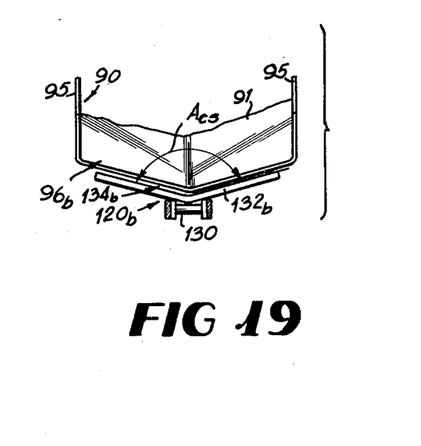
FIG. 19 is a transverse cross-sectional view taken generally along line 19—19 in FIG. 18.

The bottom wall 91 at discharge end 96$_b$ of trough 90 terminates generally normal to the longitudinal axis of the trough as seen in FIGS. 18 and 19. The discharge end 96$_b$ is centered over the side positioning feed chain 120$_b$ on the gizzard processing unit 16 and located closely adjacent thereto as seen in FIGS. 18 and 19 with the longitudinal axis of the chute 90 generally parallel to the path of movement of chain 120$_b$. The gizzard is thus washed down the trough 90 and onto the feed chain 120$_b$ without changing its orientation so that the longitudinal axis of the gizzard is aligned with the path of movement of chain 120$_b$ and the side axis $A_S$ remains vertical. The water flowing out of trough 90 onto chain 120$_b$ assists in maintaining this orientation.

The cover and chute assembly 51 seen in FIGS. 1, 9 and 11 includes an elongate cover 105 which is supported on the tops of the side beams 59 and extends along the length of the support frame 50 so that the top of the viscera removal unit 15 is covered. The cover 105 is provided with a tapered infeed chute 106 which defines a tapered feed opening 108 therethrough. The feed opening 108 is located adjacent that end of the infeed portions 66 of the viscera removal rolls 61 opposite the discharge portions 68 so that a gizzard with the viscera attached dropped in the feed opening 108 will be directed onto the top of the infeed portions 66 of the viscera removal rolls 61. It will be seen that the feed opening 108 is wider at its upper than its lower end to facilitate the feeding of the gizzards with the attached viscera and deflectors 109 are provided around the infeed chute 106 at its upper end to deflect the gizzards unloaded by the feeding unit 14 into the feed opening 108. It will be appreciated that the infeed chute is located so that it also lies under the position at which the feeding unit 14 unloads the gizzards from the viscera holding hooks VH as seen in FIG. 1. The bottom of the infeed chute 106 terminates in the viscera feeding area 79 above the viscera removal rolls 61 as best seen in FIG. 11 so that the gizzards with the viscera attached thereto are directed onto the tops of the infeed portions 66 of the viscera removal rolls 61.

The drive means 56 includes a drive motor 110 driving one of the viscera removal rolls 61 through a gear reducer 111 and a drive chain 112 best seen in FIG. 10. The drive means 56 is connected to the viscera removal roll 61 so that the tops of the viscera removal rolls 61 are rotated toward each other as indicated in FIGS. 14 and 15. The drive unit 56 may be provided with a variable speed arrangement so that the rotational speed of the viscera removal rolls 61 can be varied.

In operation, the gizzard with the viscera attached is delivered to the infeed chute 106 on the viscera removal unit 15. The infeed chute 106 directs the gizzard and attached viscera onto the top of the infeed portions 66 of the viscera removal rolls 61 adjacent the right hand end as seen in FIG. 10. The guide assembly 75 maintains the gizzard and attached viscera on top of the rolls 61. The infeed segments $70_a$ of the teeth 70 along the infeed portions 66 of the rolls 61 move the gizzard and attached viscera toward the viscera receiving space S between the infeed portions 66 of the rolls 61. Because the viscera receiving space S is just sufficiently wide to allow the viscera to pass therethrough, the tooth segments $70_a$ at the nip 71 engage and feed the viscera through the space S between the infeed portions of the rolls 61. This process is continued until the gizzard is seated against the infeed portions 66 of the rolls 61. Because the width $W_S$ of the space S is not wide enough for the gizzard to pass therethrough, the feeding movement of the viscera through the space S is arrested in the position illustrated in FIG. 14. The shape and spacing of the segments $70_a$ on teeth 70 is such that the viscera is not gripped with sufficient force to pull the viscera off of the gizzard. This allows the gizzard to be pulled toward the rolls 61 until the longitudinal axis of the gizzard is generally vertical with the tender lining section pulled into the space S between the rolls as seen in FIG. 14. This allows the primary downward pulling forces exerted by the infeed tooth segments $70_a$ to be applied to the tender lining section on the gizzard to keep it seated against the rolls 61. In other words, the viscera is used to pull the tender lining section on the gizzard into operative contact with the tooth segments $70_a$ at the nip 71 between the rolls and to maintain this contact between the tender lining section and the tooth segments $70_a$ so that the tooth segments $70_a$ grip the tender lining section sufficiently to pull the gizzard down against the rolls 61. The number of teeth 70 around the rolls 61 is such that a relatively constant pulling force is being exerted on the gizzard to keep it seated against the rolls 61. It is important that the viscera not be separated from the tender lining section at this time since it would be difficult to maintain the tender lining section in the space S if this occurs and to maintain the gizzard seated against the rolls 61. It will thus be seen that the infeed portions 66 serve to preposition the gizzard and tender lining section for further operations.

At the same time that the tooth segments $70_a$ are prepositioning the gizzard, they are also moving the gizzard and attached viscera along the length of the infeed portions 66 toward the tapered portions 69 because of their helical configuration. The length $L_1$ of the infeed portions 66 is such that the gizzard has been properly prepositioned by the time it reaches the tapered portions 69. A length $L_1$ of about twenty inches has been found satisfactory.

When the gizzard reaches the tapered portions 69 on the rolls 61 with the tender lining section between the nip 71 between the rolls, the gradually increasing thickness of the tapered tooth segments $70_b$ in the tapered portions 69 and the gradually decreasing width in the viscera receiving space S as the gizzard moves along the tapered portions 69 toward the discharge portions 68 causes the tooth segments $70_b$ to gradually increase the downward pulling forces exerted on the tender lining section on the gizzard. This serves two purposes, to more firmly seat the gizzard down against the rolls 61 and to stretch the tender lining section so that the juncture between the tender lining section and the rest of the gizzard is moved down into the nip 71 between the rolls. It is important that these downward pulling forces be gradually increased since any abrupt change in these forces causes improper separation of the tender lining section so that at least an undesirable portion of the tender lining section will be left on the gizzard. By the time the gizzard has reached the discharge portions 68 on rolls 61, the downward pulling forces and the meshing contact between the tapered tooth segments $70_b$ have reached a point that the segments $70_b$ lock onto the tender lining section and separate it from the rest of the gizzard along the juncture between the tender lining section and the rest of the gizzard. FIG. 15 is taken at about the position that separation occurs. The dislodging projections 88 sweep over the rolls 61 at the position at which separation of the tender lining section occurs so that the one of the projections 88 strikes the gizzard with a sidewise force to assist the rolls 61 in separating the tender lining section. It will be appreciated that the viscera is removed with the tender lining section. As soon as the tender lining section is separated, the gizzard is released and tumbles about so that its orientation is lost.

To better appreciate the downward forces applied to the tender lining section, reference to FIG. 3 shows the positions at which these forces are applied. In the infeed portion 66 of the viscera removal rolls 61, the position at which the primary forces are applied to the tender lining section is labelled $P_1$—$P_1$. As the gizzard moves along the tapered section 69 on the rolls 61, the position at which the primary forces are applied is gradually moved to the position labelled $P_2$—$P_2$ at the juncture between the tender lining section and the rest of the gizzard.

After the tender lining section is removed, the gizzard is tumbled over into the inlet end 92 of the alignment trough where it is oriented and washed along trough 90 into the gizzard processing unit 16.

Figure 20:
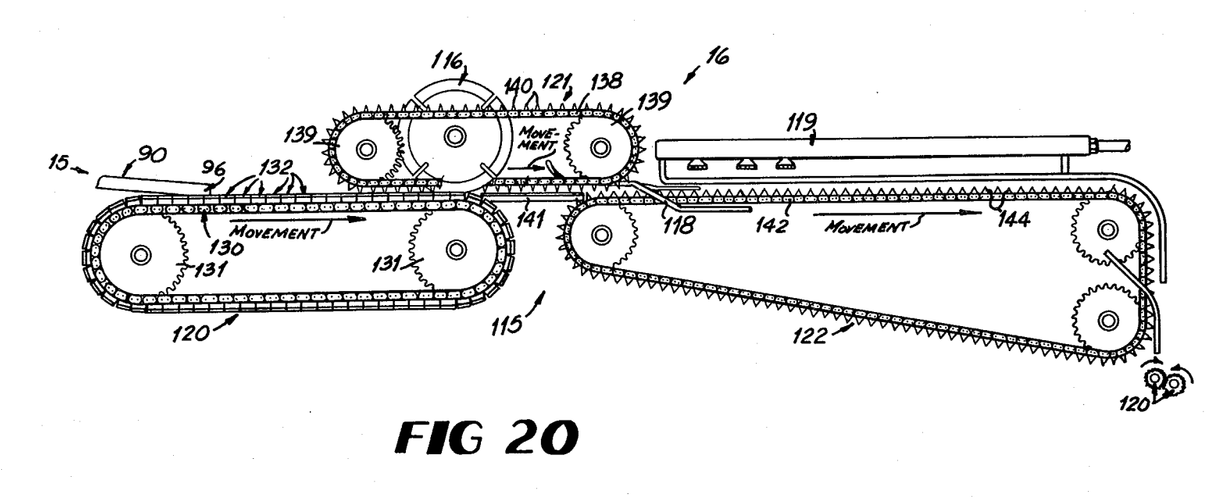
FIG. 20 is a schematic drawing illustrating the gizzard processing unit.

The gizzard processing unit 16 shown in FIG. 1 is of a typical construction found in this type of machine. The internal configuration of the unit 16 is schematically shown in FIG. 20. The unit 16 includes a conveyor system 115 for moving the gizzard through the unit, a rotary splitting knife 116 for splitting the gizzard, an opener 118 for opening the split gizzard, a water spray assembly 119 for washing the split gizzard, and a pair of lining peeler rolls 120 for peeling the pocket lining from the split gizzard to produce an edible product.

The conveyor system 115 has an infeed conveyor section 120 that receives the gizzard from the viscera removal unit 15 and moves the gizzard toward the knife 116, a transfer conveyor section 121 which assists the infeed conveyor section 120 in moving the gizzard past knife 116 and transfers the split gizzard to a discharge conveyor section 122 that transports the split gizzard past the opener 118 and water spray assembly 119 to the peeler rolls 120. A conveyor drive motor 124 is provided for driving the conveyor system 115, a knife motor 125 is provided for rotating knife 116 and a peeler drive motor 126 is provided for driving the peeler rolls 120 as illustrated in FIG. 1.

The infeed conveyor section 120 includes an endless feed chain 130 trained around a pair of sprockets 131 as seen in FIG. 20 so that the gizzards are received on the upper flight of chain 130. As mentioned hereinbefore, the feed chain 130 may be adapted to feed gizzards to the knife 116 with the edge axis $A_E$ generally vertical or with the side axis $A_S$ generally vertical. The feed chain $130_a$ seen in FIGS. 16 and 17 is designed to feed the gizzards with the edge axis $A_E$ vertical and the feed chain $130_b$ seen in FIGS. 18 and 19 is designed to feed the gizzard with the side axis $A_S$ vertical. The difference in the two types of chains 130 resides in the gizzard carriers 132 incorporated in the chains, identified $132_a$ in FIGS. 16 and 17 and $132_b$ in FIGS. 18 and 19.

The upwardly opening, V-shaped, gizzard receiving space $134_a$ in the carriers $132_a$ on chain $130_a$ subtends an angle $A_{CE}$ seen in FIG. 17 substantially equal to the edge angle $A_{GE}$ on the gizzard as seen in FIG. 4. Thus, when the gizzard is delivered from the viscera removal unit 15 to the feed chain $130_a$ over the discharge end $96_a$ of the alignment trough 90 so that the edge axis $A_E$ of the gizzard is vertical and the longitudinal axis $A_L$ is generally horizontal, the gizzard drops into the space $134_a$ and is maintained in this position as the chain $130_a$ moves the gizzard toward the knife 116. Because the knife 116 is vertically oriented and substantially centered with respect to the gizzard receiving space $134_a$, the knife 116 will split the gizzard along the cutting plane lying along the longitudinal and edges axes $A_L$ and $A_E$ of the gizzard.

The upwardly opening V-shaped gizzard receiving space $134_b$ in the carriers $132_b$ on chain $130_b$ subtends an angle $A_{CS}$ seen in FIG. 19 substantially equal to the side angle $A_{GS}$ on the gizzard as seen in FIG. 4. Thus, when the gizzard is delivered from the viscera removal unit 15 to the feed chain $130_b$ over the discharge end $96_b$ of the alignment trough 90 so that the side axis $A_S$ of the gizzard is vertical and the longitudinal axis $A_L$ is generally horizontal, the gizzard slides into the space $134_b$ and is maintained in this position as the chain $130_b$ moves the gizzard toward the knife 116. Because the knife 116 is vertically oriented and substantially centered with respect to the gizzard receiving space $134_b$, the knife 116 will split the gizzard along the cutting plane lying along the longitudinal and side axes $A_L$ and $A_S$ of the gizzard.

Referring back to FIG. 20, the transfer conveyor section 121 includes a pair of spaced apart endless transfer chains 138 mounted on support sprockets 139 so that the upstream end of the lower flights of the chains 138 overlie the gizzard receiving sapce defined along the upper flight of the feed chain 130. The transfer chains 138 have spikes 140 thereon which extend below the lower flights of the chains 138 into the gizzard receiving space 134 defined by the gizzard carriers 132 on the upper flight of the feed chain 130. The transfer chains 138 are adjusted so that the spikes 140 on the transfer chains 138, as they move along the lower flights of chains 138, will stick into the upper portion of the gizzards being moved by the feed chain 130. It will thus be seen that the chains 138 would be adjusted differently depending on whether feed chain $130_a$ or feed chain $130_b$ is used. Because the transfer chains 138 are moving at the same linear speed as the feed chain 130, the transfer chains 138 serve to lock the gizzards in position on the feed chain 130 when the spikes 140 stick into the gizzard. This serves to maintain the gizzard with the desired orientation while it is being split by the knife 116.

The knife 116 is located between the transfer chains 138 and over the feed chain 130 so that the knife 116 splits the gizzard while it is supported in the carriers 134 on feed chain 130 and after it is locked in position by spikes 140 on transfer chains 138. It will be appreciated that the knife 116 is adjusted so that it cuts into the pocket in the gizzard sufficiently for it to be opened for cleaning without cutting the gizzard into two separate pieces.

After the gizzard is split, the transfer chains 138 move the gizzard off of the feed chain 130 over a transfer plate 141 appropriately shaped and located to maintain the gizzard in engagement with the transfer chains 138 and onto the discharge conveyor section 122.

The discharge conveyor section 122 includes an endless discharge chain 142 also equipped with spikes 144. The transfer conveyor section 121 delivers the split gizzard to the upper flight of discharge chain 142 so that the spikes 144 engage the lower portion of the gizzard and move it away from the transfer conveyor section 121. The discharge chain 142 is moving at the same linear speed as the transfer chains 138 so that the gizzard is not damaged as it is transferred from chains 138 to chain 142.

The discharge chain 142 moves the split gizzard under the opener 118 which turns the gizzard inside out over the chain 142 as is typical for gizzard processing machines to expose the pocket contents for cleaning. The chain 142 then moves the opened gizzard under the water spray nozzle assembly 119 that directs water sprays against the gizzards to wash out the pocket contents and clean the gizzard.

The cleaned gizzard is unloaded from the discharge chain 142 at its discharge end and directed into engagement with the toothed peeler rolls 119. The toothed peeler rolls 119 peel the pocket lining off of the cleaned gizzard to produce an edible product.

What is claimed as invention is:

1. Apparatus for separating poultry gizzards from the tender lining section as well as the food intake and digestive portions of the gastrointestinal tract naturally connected to the gizzard through the tender lining section comprising:
   a pair of rotatably mounted viscera removal rolls having infeed and discharge ends, each of said viscera removing rolls including an infeed portion adjacent the infeed end thereof, a discharge portion adjacent the discharge end thereof and a tapered portion connecting said infeed and discharge portions, each of said infeed, discharge and tapered portions defining a plurality of helical teeth thereon, said infeed portion having a first thread crest diameter, said discharge portion having a second thread crest diameter larger than said first thread crest diameter, and said tapered portion having a thread crest diameter which increases from said first thread crest diameter at said infeed portion to said second thread crest diameter at said discharge portion; said viscera removal rolls arranged in a side-by-side relationship with said infeed, discharge and tapered portions of each of said rolls laterally aligned with the corresponding infeed, discharge and tapered portions of the other of said rolls so that said helical teeth on said discharge portions of said rolls drivingly intermesh with each other to drivingly rotate one of said rolls when the other of said rolls is rotated and so that an elongate viscera receiving space is defined between said infeed portions of said removal rolls sized to permit the food intake and digestive portions of the gastrointestinal tract as well as the tender lining portion on the gizzard to pass therethrough but to prevent the gizzard from passing therethrough, said teeth on said infeed portions of said removal rolls arranged to pull the food intake and digestive portions through said viscera receiving space, to pull the tender lining section into said viscera receiving space until restrained by the gizzard engaging said infeed portions of said removal rolls without separating the food intake and digestive portions from the tender lining section, and to propel the gizzard with the tender lining section, food intake portion and digestive portion still attached to said tapered portion as said removal rolls are rotated, said teeth on said tapered portion arranged to engage the tender lining section on the gizzard between the gizzard and the food intake and digestive portions of the gastrointestinal tract and propel the gizzard toward said discharge portions of said removal rolls whereby the intermeshing of said teeth on said discharge portions of said removal rolls sever the tender lining from the gizzard along the juncture between the gizzard and the tender lining; and drive means for rotating said viscera removal rolls so that, when the gizzard with the other viscera attached thereto is placed onto said rolls adjacent the intake ends thereof, the other viscera will be forced through said viscera receiving space between said rolls, the tender lining section will be forced into said viscera receiving space and said teeth on said rolls will move the gizzard from the infeed end toward the discharge end of said rolls whereby said rolls will separate the tender lining and other viscera from the gizzard.

2. The apparatus of claim 1 wherein said helical teeth on said infeed portions of said removal rolls are arranged with respect to said helical teeth on said discharge portions of said removal rolls whereby said helical teeth on said infeed portion of one of said removal rolls are maintained out of mesh with said helical teeth on said infeed portion of the other of said removal rolls as said removal rolls are driven through said intermeshing teeth on said discharge portions of said removal rolls so that, when the food intake and digestive portions of the gastrointestinal tract are forced through said viscera receiving space and the tender lining section is forced into said viscera receiving space until the gizzard is seated against said rolls by said helical teeth on said infeed portions on said removal rolls, the force keeping the gizzard seated against said rolls is applied through the tender lining section to prevent separation of the food intake and disgestive portions from the tender lining section by said helical teeth on said infeed portions of said removal rolls.

3. The apparatus of claim 1 further including removal means for engaging the gizzard after the food intake and digestive portions have passed between said removal rolls and forcing the gizzard cross-wise of said rolls to cause the tender lining section along with the other viscera attached thereto to be separated from the gizzard.

4. The apparatus of claim 1 wherein the crest diameter of said helical teeth on said infeed portions of said removal rolls and the spacing between said infeed portions of said removal rolls are selected to apply a holding force through the tender lining section on the gizzard along a first path to maintain the gizzard seated against said infeed portions of said removal rolls as the gizzard is moved therealong and wherein the thread crest diameter of said helical teeth on said discharge portions and the spacing between said discharge portions of said removal rolls are selected to apply a separating force through the tender lining section on the gizzards received from said infeed portions of said removal rolls along a second path closer to the gizzard than said first path to separate the tender lining from the gizzard along said second path.

5. The apparatus of claim 1 for use with a gizzard processing unit adapted to receive gizzards with a given orientation wherein the orientation of the gizzard is lost when the gizzard is removed from said removal rolls further including transfer means for receiving the gizzards from said viscera removal rolls after the tender lining section and the other viscera attached thereto have been removed from the gizzards, orienting the gizzards with the given orientation for the processing unit and feeding the thusly oriented gizzards to the processing unit for further processing.

6. The apparatus of claim 1 further including guide means for maintaining the gizzard and the other viscera in operative contact with said viscera removal rolls.

7. The apparatus of claim 1 further including conveying means for conveying the gizzards with the other viscera attached thereto along a conveying path past an unloading station and feeding means at said unloading station for removing the gizzards from said conveying means and delivering the gizzards with the other viscera attached thereto to said viscera removal rolls.

8. The apparatus of claim 7 further including adjustment means operatively associated with said conveying means for adjusting the other viscera naturally attached to each gizzard to a predetermined length before the gizzards reach said feeding means.

9. The apparatus of claim 1 wherein each of said helical teeth on said infeed portion of said removal rolls is continuous with one of said helical teeth on said tapered portion of said removal rolls, wherein each of said helical teeth on said tapered portion of said removal rolls is continuous with one of said helical teeth on said discharge portion of said helical rolls, and wherein those segments of said helical teeth along said infeed portion of said viscera removal rolls have a transverse cross-sectional width narrower than the transverse cross-sectional width of said helical teeth along said discharge portions of said viscera removal rolls so that possible intermeshing of those portions of said helical teeth along said infeed portions is prevented.

10. The apparatus of claim 9 wherein those segments of said helical teeth along said infeed portion are pointed at their projecting ends, those segments of said helical teeth along said discharge portion define a flat land surface on the projecting end thereof of a prescribed width, and those segments of said helical teeth along said tapered portion taper in width, at their projecting ends from a point at said infeed portion to a flat land surface of said prescribed width at said discharge portion so that the gripping force applied to the tender lining section on the gizzard by said helical teeth is gradually increased as the gizzard moves along said tapered portion from said infeed portion toward said discharge portion.

11. The apparatus of claim 10 wherein the diametrical pitch of said helical teeth on each of said removal rolls is about 8-16.

12. The apparatus of claim 11 wherein the thread crest diameter of said infeed portions of said removal rolls is about 1.1 inches and the thread crest diameter of said discharge portions of said removal rolls is about 1.3 inches.

* * * * *